June 2, 1959
J. H. FRAKES
BUSHING FOR ELECTRICAL APPARATUS
Filed Aug. 31, 1954
2,889,395
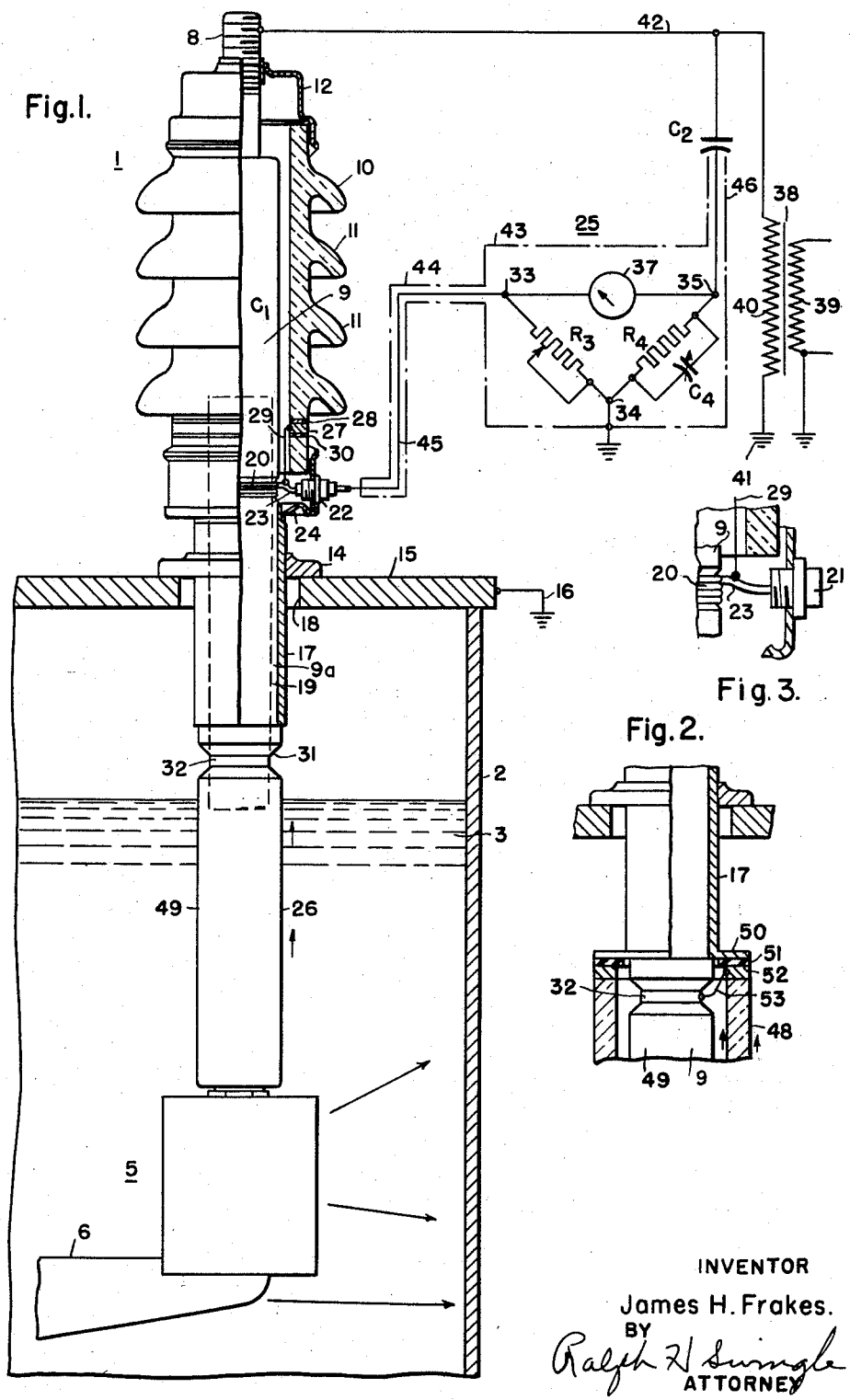
INVENTOR
James H. Frakes.
BY
Ralph H. Swingle
ATTORNEY

United States Patent Office 2,889,395
Patented June 2, 1959

2,889,395

BUSHING FOR ELECTRICAL APPARATUS

James H. Frakes, Penn Township, Allegheny County, Pa., assignor to Westinghouse Electric Corporation, East Pittsburgh, Pa., a corporation of Pennsylvania Application August 31, 1954, Serial No. 453,181

4 Claims. (Cl. 174—140)

This invention relates to bushings for electrical apparatus and, more particularly, to bushings for insulating the leads of such electrical apparatus as transformers, circuit interrupters, and related apparatus.

A general object of my invention is to provide an improved bushing construction for readily obtaining the power factor thereof without the necessity of disconnecting the winding or other apparatus from the bushing.

As well known by those skilled in the art, it is desirable to periodically determine whether a bushing is reliable or defective by measuring the energy loss through, and the charging current or capacitance of, the insulation when alternating voltage of known value is applied to the insulation in the field; i.e., the location where it is set up for use. F. C. Doble Patent 1,945,263 illustrates one type of testing apparatus. The power factor is a good indication of the condition of insulation, inasmuch as the power factor of the insulation does not depend upon the size of the test specimen, but only upon its quality as insulation. There would be no energy loss whatsoever in a perfect insulator, and as a consequence, a perfect insulator would have zero power factor. Thus, the power factor of the insulation is indicative of its electrical insulation qualities.

Conditions which will lead to an increase in the energy loss through the bushing, and hence an increase in the value of the power factor, will be the seepage of moisture through gaskets and joints into the bushing to cause deterioration therein, slight leakage currents across dirty or contaminated surfaces interiorly and exteriorly of the bushing casing, voids in the condenser winding which may char over long periods of time, and leakage through the oil exteriorly of the bushing. All these leakage currents are in parallel between the energized conductor stud passing through the bushing and the grounded supporting flange. Thus, if the foregoing conditions are ignored, or not periodically checked, the breakdown resistance of the insulation may be lowered to such an extent that the bushing may fail in service.

If the power-factor test is made upon a bushing while apparatus remains connected thereto, a misleading reading of the power factor will be obtained because of the leakage currents passing between the connected apparatus and ground, all of which leakage currents are in parallel with the leakage current through the bushing and are hence measured by the test equipment.

To avoid this result, it has been the practice to drain the oil from the tanks housing circuit breakers or transformers and disconnect the enclosed apparatus from the bushing. This involves considerable time and expense, and in addition requires the removal of the bushing from service.

To avoid the disconnection process, it has been suggested in Fawcett et al. Patent 2,239,598 to ground the conducting stud of the bushing, and hence the connected apparatus, and apply a "hot-collar" test, involving a collar at the high potential of the test circuit surrounding the bushing away from the grounded supporting flange, measuring the power factor of the insulation underneath the collar. My Patent 2,679,026, issued May 18, 1954, is concerned with a similar method of measuring the power factor of the bushing while grounding the centrally disposed conductor stud and all apparatus connected thereto.

Recently another power-factor test, called the "Ungrounded Power-Factor Test Method" has been coming into more prominent use, which eliminates the disturbing influences of leakage currents of connected apparatus. With this test method, the apparatus is not disconnected, but a metal layer on the outside of the bushing insulation is used to measure the power factor of the bushing insulation. The lead to this metal layer is insulated from the grounded flange, and the test circuit measures only the leakage current pasing through the lead. The conductor stud is at high potential, as is the connected apparatus, but the leakage current from the connected apparatus to the grounded flange bypasses the measuring equipment, and hence does not influence or distort the power-factor measurement on the bushing insulation. S. Terpak et al. Patent 2,402,466 describes such an ungrounded power-factor test method, but gives an incomplete power-factor measurement, and it is a purpose of my invention to remedy the situation so as to obtain a complete power-factor test using the ungrounded power-factor test method.

More particularly, if the upper porcelain is cracked, has low surface resistance, etc., in the Terpak et al. bushing, and the lower porcelain casing is likewise cracked, has low surface resistance, etc., the leakage current caused by these conditions will not be measured or detected by the method used by Terpak and Wetherill.

It is another object of my invention to remedy this defect in the ungrounded power-factor test method used by Terpak et al. to provide an improved bushing construction such that these surface leakage currents will be included in the power-factor measurement, so that such power-factor measurement will be a true and accurate indication of the reliability of the the tested bushing.

Still another object of my invention is to provide an improved construction for a bushing having a shield about the insulation thereof, in which one or more collecting rings are employed to collect surface leakage currents during power-factor testing, which collecting rings are electrically connected to the shield and may be electrically isolated from the grounded supporting flange of the bushing.

Still a further object of my invention is to provide an improved bushing construction utilizing a shield surrounding the bushing insulation with a collecting ring utilized at one end of the bushing to collect leakage currents across the external casing of the bushing, and in addition exposing an annular portion of said shield for collecting the leakage current across the outside of the other end of the terminal bushing.

Further objects and advantages will readily become apparent, upon reading the following specification, taken in conjunction with the drawing, in which:

Figure 1 is a somewhat diagrammatic view of an insulating bushing associated with a circuit interrupter tank, with the bushing partially in side elevation, and partially in vertical section, illustrating the power-factor measuring equipment associated therewith during power-factor test measurements;

Fig. 2 is a fragmentary portion of a slightly modified type of bushing having a lower porcelain casing associated therewith; and Fig. 3 is an enlarged, fragmentary, sectional view, partially in side elevation, of the conducting plug assembly, normally used to ground the measuring shield.

Referring to the drawing, and more particularly to Fig. 1 thereof, the reference numeral 1 generally designates an insulating bushing extending interiorly within a tank 2 containing a suitable arc-extinguishing fluid 3, in this particular instance circuit breaker oil. Associated with the interior end of the terminal bushing 1 is an arc-extinguishing unit generally designated by the reference numeral 5, and utilized to interrupt the arc established during the opening operation of the interrupter by a lowering of a conducting cross-bar 6.

As well known by those skilled in the art, suitable means are provided, including the usual lift rod, not shown, for effecting upward or closing movement of the cross-bar 6 to close the circuit through the interrupter, or to effect downward opening motion of the cross-bar 6, effecting thereby breaking of the circuit through the interrupter.

The particular internal construction of the arc-extinguishing unit forms no part of my invention, and reference may be had to U.S. Patent 2,467,760, issued April 19, 1949, to Leon R. Ludwig, Benjamin P. Baker, and Winthrop M. Leeds, and assigned to the assignee of the instant application, for a description of a possible interrupter which may be employed.

The insulating bushing 1, in this particular instance, includes a conducting stud 8 which passes interiorly, centrally through the bushing, and has disposed thereabout suitable insulation 9. The insulation 9 may comprise a plurality of spaced cylinders of any suitable insulating material having oil therebetween, or may be of any suitable construction. In the particular arrangement shown in Fig. 1, the bushing insulation 9 includes a wrapping of fabric or paper thereabout having condenser foils interspersed therein. As well known by those skilled in the art, the condenser foil layers are utilized to grade the voltage through the insulation 9 of the bushing 1 so that no portion thereof will be unduly electrically stressed.

A suitable weatherproof casing 10, in this particular instance porcelain, is provided adjacent the upper end of the bushing 1 having one or more petticoats 11 formed therealong to increase the surface flashover distance. A terminal cap 12 is provided at the upper end of the bushing 1 being threadedly secured to the upper end of the conducting stud 8, and serving to maintain the porcelain weather casing 10 in compression.

Disposed intermediate the ends of the bushing 1 is a supporting flange 14, resting upon the cover 15 of the tank 2. The supporting flange 14 is at ground potential as indicated at 16, and has associated therewith an axially extending tubular portion 17 extending through the opening 18 of the cover 15.

Encircling the bushing insulation 9, and disposed immediately adjacent to the grounded tubular portion 17, yet insulated therefrom by an insulating cylindrical layer 9a, is a shield 19 of suitable conducting material. The shield 19 may be formed in any suitable manner, such as by providing an insulating layer with conducting particles, such as carbon; or the shield 19 may be the outer foil layer of the wrapping making up the bushing insulation 9.

To enable leakage current passing to the shield 19 to be taken out of the bushing 1 and measured, and maintained separate from leakage current passing to the grounded flange 14, a wire wrapping 20 may be provided which makes contacting engagement adjacent the upper end of the shield 19. The wire wrapping 20 is connected to a power-factor test plug assembly 22 of generally spark-plug configuration, so that during a power-factor test, the leakage current passing to the measuring shield 19 may be isolated, or insulated from the grounded flange 14. During normal operation of the bushing, the shield 19 is grounded by being electrically connected to the grounded flange 14 by a conducting plug assembly 21, shown in Fig. 3, which electrically connects the test lead 23 with the metallic supporting cup 24 and hence to the grounded flange 14. During a power-factor test measurement, such a plug assembly or releasable connector device 21 is removed, and a connection can be made with the test lead 23 so that leakage current passing to the measuring shield 19 may be taken externally out of the bushing 1 separately and measured, as illustrated in Fig. 1.

The foregoing construction is generally the same as that utilized in the Terpak et al. bushing, and if the power-factor measuring equipment, generally designated by the reference numeral 25, measured only the leakage current passing to the measuring shield 19, it would eliminate any leakage current passing along the surfaces of the porcelain weatherproof casing 10 and also along the lower surface 26 of the bushing. These surfaces may become dirty and contaminated, and the porcelain weather casing 10 may become cracked or burned so that the surface resistance may be lowered.

To enable the leakage current along the interior and exterior surfaces of the porcelain weather casing 10 to be measured, together with the leakage current passing through the insulation 9 to the shield 19, I provide a conducting collecting ring 27 at the lower end of the weatherproof casing 10. A coducting gasket 28 of lead may be employed to accommodate the imperfections at the lower end of the porcelain casing 10. A connection 29 is made between the conducting collecting ring 27 and the lead 23 leading to the power-factor tap assembly 22. It will be noted, however that a non-conducting gasket 30 of rubber, or such like material, is employed to insulate the conducting ring 27 from the grounded flange 14.

To enable the leakage current passing along the outer surface of the lower end 26 of the bushing 1 to also be collected by the shield 19, the insulation 9 is cut away, as at 31, to expose a smaller annular portion 32 of the conducting shield 19. As a result, any leakage current passing along the outer surface 26 of the lower end of the bushing 1 will be collected by the shield 19, and together with leakage current passing through the insulation 9, and with leakage current passing downwardly along the surfaces of the porcelain casing 10, may be collected by the power-factor test terminal 23 and measured by the power-factor measuring equipment 25.

The power-factor measuring equipment 25 is of the Schering-bridge type, which is described more fully in Patent No. 1,166,159, issued December 28, 1915, to Thomas, and Patent No. 2,130,865, issued September 20, 1938, to T. R. Watts and myself. As shown, a variable resistance $R_3$ is connected to a junction 33, and grounded as indicated at 34, while a circuit including a variable condenser $C_4$ in parallel with a resistor $R_4$ is connected between the junction 35 and the grounded junction 34 to form another arm of the bridge circuit. A measuring instrument 37 is connected between the junctions 33 and 35 to indicate the condition of balance of the bridge.

The bushing 1 constitutes a capacitance $C_1$ which is between the high tension terminal 8 and the junction 33, to form a third arm of the bridge circuit, while the condenser $C_2$ will function as the fourth arm of the circuit, and result in a Schering-bridge arrangement of the type indicated.

To provide a relatively high test potential of the order of 10 kv., a step-up transformer 38 is utilized, with the primary winding 39 energized from the conventional 115 volt alternating current source. The secondary winding 40 has one end thereof grounded, as at 41, while the high potential end of the secondary winding 40 is connected by a conductor 42 to the terminal 8 of the bushing 1.

The test set 25 is preferably provided with a guard shield designated at 43, which may be of a type well known in the art. The guard shield 43 may be at ground potential, or, if desired, maintained at a potential slightly higher than ground by an intervening resistance, not shown. In addition, a metallic shield 44, surrounding the test lead 45, is preferably provided and may be connected to the guard shield 43 in the manner shown. In addition, another guard shield 46 may guard the capacitance $C_2$ from extraneous influences, and be electrically connected with the guard shield 43 as indicated.

When the bridge circuit of Fig. 1 is in balanced condition, the power factor of the portion of the bushing connected therein may be determined from the equations given in the aforementioned patents to Thomas and to Watts and myself. In the particular circuit shown, for example, the following relationship exists between the power-factor angle and the circuit impedance values:

$$\cot \theta = \omega R_4 C_4$$

Since the cotangent of $\theta$ is substantially equal to the cosine for large angles, which are encountered in this work, this may be taken as the value of the power factor of the device.

From the foregoing description, it will be noted that the leakage currents across the weatherproof casing 10, through the bushing insulation 9, and upwardly along the lower surface 26 of bushing 1, are all collected by the shield 19 and measured through the power-factor testing equipment 25. Leakage currents passing to the tank 2 from the extinguishing unit 5 through the oil will pass to ground 16, and will bypass the measuring equipment 25, as shown in Fig. 1. Thus, the bridge circuit 25 will measure completely all the energy losses associated with the bushing 1, and will not include therewith the energy losses resulting from leakage currents passing from the unit 5 and through the oil to the grounded tank 2. The result is a complete power-factor measurement of the bushing 1 indicating its reliability.

Fig. 2 illustrates a slight constructional modification of the bushing 1, where a lower insulating casing 48 is employed, such as porcelain, which encloses the lower wrapping 49 of the insulation 9. Here the tubular portion 17 has an outwardly jutting flange portion 50, against which is pressed an insulating gasket 51, beneath which is a conducting collecting ring 52. The collecting ring 52 is analogous to the collecting ring 27 and is permanently connected by a lead 53 to the exposed annular portion 32 of the collecting shield 19. The principle is the same; namely, that leakage current passing upwardly along the casing 48 will be collected at the conducting ring 52, insulated from the grounded flange 50, and conducted by lead 53 through the measuring shield 19 to the power-factor tap assembly. The principle is the same as in Fig. 1, except an external lower casing 48 is utilized, instead of permitting the wrapping 49 at the lower end of the bushing 1 to be exposed to the oil 3 as was the case in Fig. 1.

From the foregoing two embodiments of my invention, it will be observed that I have provided an improved bushing construction which will enable a complete ungrounded power-factor test method to be utilized, in which leakage currents passing along the casings 10, 48 of the bushing 1, and through the insulation 9 thereof may be measured in segregated manner from the leakage current which passes from the connected apparatus 5 to the grounded tank 2, the latter bypassing the power-factor measuring equipment 25.

Although I have shown and described specific structures, it is to be clearly understood that the same were merely for the purpose of illustration, and that changes and modifications may readily be made therein by those skilled in the art without departing from the spirit and scope of the invention.

I claim as my invention:

1. A bushing for electrical apparatus including an outer weatherproof casing of insulating material, a grounded supporting flange axially disposed with respect to said casing and spaced therefrom, a high-voltage conductor extending through said casing and said flange, a conducting collecting ring between adjacent surfaces of said casing and said flange, means insulating said ring from said flange, a conducting measuring shield radially surrounding said conductor and extending through said flange, said conducting measuring shield being electrically insulated from said conductor and from said flange and electrically connected to said collecting ring, a grounded metallic supporting cup supporting said outer casing disposed between said flange and said outer casing and having a power-factor test-plug assembly extending therethrough and supported thereby, said power-factor test-plug assembly comprising a test lead insulated from said metallic supporting cup, means connecting said conducting collecting ring to said test lead, said supporting flange being free of electrical connection with said weatherproof casing except by way of said conducting collecting ring, and means associated with said powerfactor test-plug assembly detachably connecting said test lead to said grounded flange during normal operation of the bushing.

2. A bushing for electrical apparatus including a high-voltage conductor for carrying current, insulating means surrounding the high-voltage conductor, a grounded supporting flange, a conducting measuring shield surrounding said insulating means and insulated from the supporting flange, an outer hollow weatherproof casing of insulating material disposed adjacent one end of the bushing, a conducting collecting ring disposed between adjacent surfaces of said hollow casing and supporting flange and insulated from the supporting flange, connecting means electrically interconnecting the conducting measuring shield with the collecting ring, means detachably connecting the measuring shield with the supporting flange during normal operation of the bushing, said grounded supporting flange being free of electrical connection with said hollow weatherproof casing except by way of said conducting collecting ring, and the measuring shield being exposed to the surface of the bushing adjacent the other end of the bushing to collect surface leakage currents over the external surface of the bushing adjacent said other end thereof during a power-factor measuring operation.

3. The combination in a terminal bushing of two spaced insulating hollow shells of insulating material, a centrally disposed supporting flange disposed between the shells and at ground potential, a high-voltage conductor for carrying current extending through the hollow shells and also through the supporting flange, insulating means surrounding said high-voltage conductor, a conducting measuring shield surrounding said insulating means, a pair of spaced collecting rings of conducting material disposed between the adjacent ends of said two spaced insulating hollow shells and insulated from the supporting flange, said centrally disposed supporting flange being free of electrical connection with said hollow shells except by way of said pair of collecting rings, means connecting the measuring shield with both spaced collecting rings, a power-factor test terminal insulated from said grounded supporting flange, means connecting the measuring shield with said power-factor test terminal, and a releasable connector device for electrically connecting said power-factor test terminal to the supporting flange to maintain them at the same electrical potential during normal operation of the bushing.

4. A bushing for electrical apparatus including an outer weatherproof casing of insulating material disposed adjacent one end thereof, a grounded supporting flange axially disposed with respect to said casing and spaced therefrom, said supporting flange being also disposed intermediate the ends of the bushing, a high-voltage conductor extending through said casing and said flange, a conducting collecting ring between adjacent surfaces of said casing and said flange, means insulating said ring from said flange, a conducting measuring shield radially surrounding said conductor and extending through said flange, said conducting measuring shield being electrically insulated from said conductor and from said flange and electrically connected to said collecting ring, said conducting measuring shield being exposed to the external surface of the bushing adjacent the other end of the bushing for the collection of surface leakage currents during a power-factor measuring operation, a grounded metallic supporting cup supporting said outer casing disposed between said flange and said outer casing and having a power-factor test-plug assembly extending therethrough and supported thereby, said power-factor test-plug assembly comprising a test lead insulated from said metallic supporting cup, means connecting said conducting collecting ring to said test lead, said supporting flange being free of electrical connection with said weatherproof casing except by way of said conducting collecting ring, and means associated with said power-factor test-plug assembly detachably connecting said test lead to said grounded flange during normal operation of the bushing.

References Cited in the file of this patent

UNITED STATES PATENTS

| | | |
|---|---|---|
| 2,195,003 | Danvers | Mar. 26, 1940 |
| 2,249,862 | Skvortzoff et al. | July 22, 1941 |
| 2,402,466 | Terpak et al. | June 18, 1946 |